United States Patent
Watanabe

(10) Patent No.: US 10,401,715 B2
(45) Date of Patent: Sep. 3, 2019

(54) DOME COVER, CAMERA DEVICE, INJECTION MOLDING DIE, AND INJECTION MOLDING METHOD

(71) Applicant: FUJIFILM Corporation, Tokyo (JP)

(72) Inventor: Seiichi Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/714,467

(22) Filed: Sep. 25, 2017

(65) Prior Publication Data

US 2018/0017851 A1    Jan. 18, 2018

Related U.S. Application Data

(63) Continuation of application No. PCT/JP2015/083601, filed on Nov. 30, 2015.

(30) Foreign Application Priority Data

Mar. 26, 2015   (JP) ................................. 2015-064775

(51) Int. Cl.
*G03B 11/00*     (2006.01)
*G03B 17/56*    (2006.01)
(Continued)

(52) U.S. Cl.
CPC ........ *G03B 17/568* (2013.01); *B29C 45/2708* (2013.01); *G03B 11/00* (2013.01);
(Continued)

(58) Field of Classification Search
CPC ........................ H04N 5/2252; G08B 13/19619
See application file for complete search history.

(56) References Cited

U.S. PATENT DOCUMENTS

2002/0010993 A1    1/2002  Wada et al.
2003/0171652 A1    9/2003  Yokoi et al.
(Continued)

FOREIGN PATENT DOCUMENTS

CN    1866121 A    11/2006
CN    1873515 A    12/2006
(Continued)

OTHER PUBLICATIONS

International Preliminary Report on Patentability and English translation (Form PCT/IPEA/409), dated May 31, 2016, for International Application On PCT/JP2015/083601.
(Continued)

*Primary Examiner* — Noam Reisner
(74) *Attorney, Agent, or Firm* — Birch, Stewart, Kolasch & Birch, LLP

(57) ABSTRACT

The invention provides a dome cover, a camera device, an injection molding die, and an injection molding method in which generation of a weldline is suppressed and deterioration of an acquired image is suppressed. In one aspect of the invention, a dome cover is a dome cover that covers a camera. The dome cover includes a curved section having a curved shape and a skirt section having a cylinder shape and has a top section at the curved section and an opening end section at the skirt section. The thickness of the dome cover is largest at the top section and smallest at the opening end section, and continuously decreases from the top section toward the opening end section. The inner diameter and the outer diameter of the dome cover continuously increase from the top section toward the opening end section.

11 Claims, 10 Drawing Sheets

(51) Int. Cl.
  *B29C 45/27*  (2006.01)
  *G03B 17/02*  (2006.01)
  *H04N 5/225*  (2006.01)
  *B29C 45/00*  (2006.01)
  *B29C 31/00*  (2006.01)
  *B29L 31/00*  (2006.01)

(52) U.S. Cl.
  CPC ............. *G03B 17/02* (2013.01); *G03B 17/56* (2013.01); *H04N 5/2252* (2013.01); *B29C 2045/0037* (2013.01); *B29L 2031/773* (2013.01)

(56) References Cited

U.S. PATENT DOCUMENTS

| | | | |
|---|---|---|---|
| 2004/0027459 | A1 | 2/2004 | Segawa et al. |
| 2006/0017842 | A1* | 1/2006 | Jun ................... G03B 37/02 348/373 |
| 2006/0177217 | A1* | 8/2006 | Opmeer .......... G08B 13/19619 396/427 |
| 2009/0310956 | A1 | 12/2009 | Takada et al. |
| 2013/0094848 | A1 | 4/2013 | Wada et al. |

FOREIGN PATENT DOCUMENTS

| | | |
|---|---|---|
| CN | 101351319 A | 1/2009 |
| CN | 201315000 Y | 9/2009 |
| CN | 202507470 U | 10/2012 |
| CN | 102928967 A | 2/2013 |
| CN | 102985873 A | 3/2013 |
| CN | 203896424 U | 10/2014 |
| JP | 11-291254 A | 10/1999 |
| JP | 2000-156810 A | 6/2000 |
| JP | 2003-210394 A | 7/2003 |
| JP | 2003-325441 A | 11/2003 |
| JP | 2004-65574 A | 3/2004 |
| JP | 2004-65575 A | 3/2004 |
| JP | 2004-320526 A | 11/2004 |
| JP | 2005-300659 A | 10/2005 |

OTHER PUBLICATIONS

International Search Report and Written Opinion of the International Searching Authority (Forms PCT/ISA/237 and PCT/ISA/210), dated Dec. 28, 2015, for International Application No. PCT/JP2015/083601, with an English translation of the Search Report.
Chinese Office Action and Search Report, dated Mar. 25, 2019, for counterpart Chinese Application No. 201580077972.3, with an English translation.

* cited by examiner

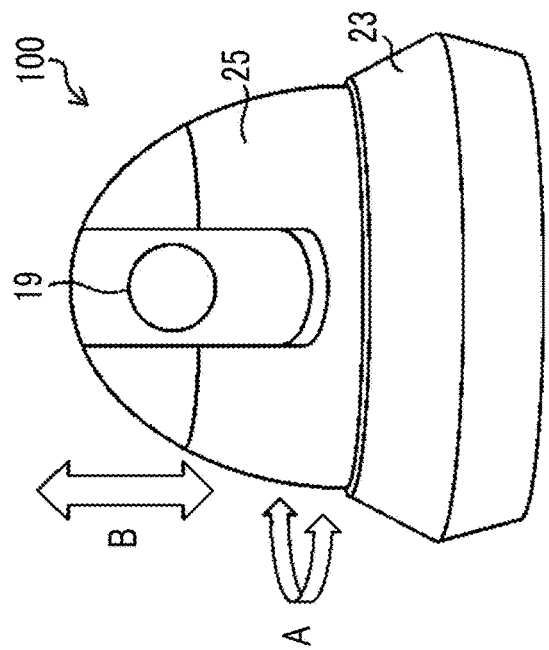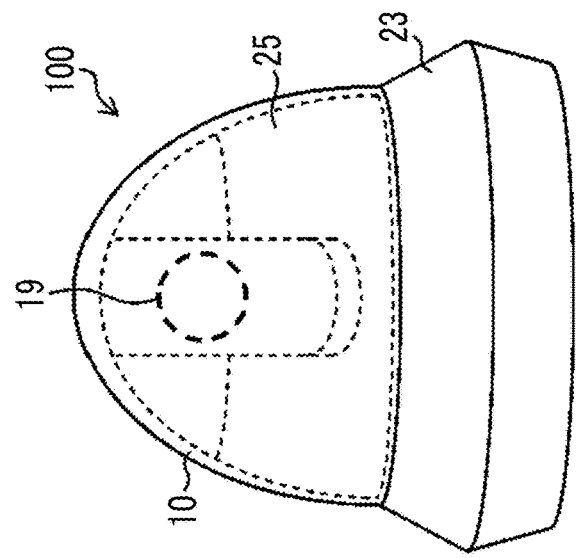

DOME COVER, CAMERA DEVICE, INJECTION MOLDING DIE, AND INJECTION MOLDING METHOD

CROSS-REFERENCE TO RELATED APPLICATIONS

The present application is a Continuation of PCT International Application No. PCT/JP2015/083601 filed on Nov. 30, 2015 claiming priority under 35 U.S.C. § 119(a) to Japanese Patent Application No. 2015-064775 filed on Mar. 26, 2015. Each of the above applications is hereby expressly incorporated by reference, in their entirety, into the present application.

BACKGROUND OF THE INVENTION

1. Field of the Invention

The present invention relates to a dome cover, a camera device, an injection molding die, and an injection molding method, and particularly, the technique for a dome cover in which the thickness of the dome cover is adjusted.

2. Description of the Related Art

Pan tilt cameras capable of changing an imaging direction have been known from the past. The pan tilt cameras may be covered with a dome cover from viewpoints of dust-proofing, drip-proofing, and failure prevention.

Various shapes are suggested from viewpoints of the intended purpose of the pan tilt cameras or prevention of deterioration of an image picked up by the pan tilt cameras as shapes of the dome cover.

For example, dome covers having a shape in which a semi-spherical shape and a cylindrical shape are joined together are suggested.

Additionally, a technique for changing the thickness of a dome cover, thereby improving the moldability or the optical properties of the dome cover, is suggested.

A technique for designing the thickness of a top section in a semi-spherical dome cover to be larger than the thickness of an opening end section is disclosed in JP2000-156810A. The technique described in JP2000-156810A aims at suppressing strain in the molding of the dome cover.

Additionally, a technique for designing the thickness of a top section in a semi-spherical dome cover to be smaller than the thickness of an opening end section is disclosed in JP2005-300659A. The technique described in JP2005-300659A aims at suppressing strain in the molding of the dome cover.

SUMMARY OF THE INVENTION

Here, a resin surrounding the vicinity of the top section of the curved section and a resin surrounding the skirt section are not constant in terms of the progress of the resins injected from a gate, within an injection molding die in the case of molding the dome cover having the semi-spherical portion (curved section) as described above and the cylindrical portion (skirt section) as described above. That is, since the path of the resin surrounding the vicinity of the top section of the curved section is longer than the path of the resin surrounding the skirt section, the progress of the resin surrounding the vicinity of the top section of the curved section is delayed with respect to the progress of the resin surrounding the skirt section.

In this way, if the progress of the resin surrounding the vicinity of the top section of the curved section and the progress of the resin surrounding the skirt section are not constant, a weldline may be generated in a place where the resin surrounding the vicinity of the top section of the curved section and the resin surrounding the skirt section are put together.

In order to suppress the generation of the weldline, it is considered that the speed of the resin surrounding the skirt section is slow down by making the thickness of the skirt section uniformly small, and the timing of the progress of the resin surrounding the skirt section and the timing of the progress of the resin surrounding the curved section are matched with each other.

However, if the thickness of the skirt section is uniformly made small, a difference in thickness may occur in a boundary surface between the curved section and the skirt section, and deterioration of an image may occur due to the light that passes through the boundary surface.

Additionally, as another method for suppressing generation of a weldline, it is considered that the timing of the progress of the resin surrounding the skirt section and the timing of the progress of the resin surrounding the curved section are matched with each other by providing a difference in mold temperature in a place where the curved section of the mold is molded and a place where the skirt section is molded.

However, if temperature is changed in a portion of the mold, the design of the mold or the work of temperature management becomes complicated.

Moreover, in the dome cover having uniform thickness at the curved section and the skirt section, deterioration of an image may occur due to the boundary surface between the curved section and the skirt section.

In JP2000-156810A and JP2005-300659A, the technique regarding the semi-spherical dome cover is described, and the dome cover having the curved section and the skirt section is not mentioned.

Additionally, in the technique described in JP2005-300659A, the thickness of the top section is designed to be smaller than the thickness of the opening end section. Thus, it is difficult to match the timing of the progress of the resin surrounding the skirt section with the timing of the progress of the resin surrounding the curved section, and it difficult to suppress generation of a weldline.

The invention has been made in view of such circumstances, and an object thereof is to provide a dome cover, a camera device, an injection molding die, and an injection molding method in which generation of a weldline is suppressed and deterioration of an acquired image is suppressed.

A dome cover that is one aspect of the invention for achieving the above object is a dome cover that covers a camera. The dome cover comprises a curved section having a curved shape; and a skirt section having a cylinder shape. A top section is provided at the curved section and an opening end section is provided at the skirt section. A thickness of the dome cover is largest at the top section and is smallest at the opening end section and continuously decreases from the top section toward the opening end section. An inner diameter and an outer diameter of the dome cover continuously increase from the top section toward the opening end section.

According to this aspect, the thickness of the dome cover is largest at the top section and is smallest at the opening end section and continuously decreases from the top section toward the opening end section. Thus, the timing of the progress of a resin surrounding (forming) the skirt section and the timing of the progress of a resin surrounding (forming) the curved section can be matched with each other. Accordingly, in the present aspect, generation of a weldline is suppressed.

Additionally, in the present aspect, the thickness of the dome cover is largest at the top section and is smallest at the opening end section and continuously decreases from the top section toward the opening end section. Thus, distortion of an image originating from the boundary surface between the curved section and the skirt section in the image acquired by the camera device to which the dome cover of the present aspect is attached is suppressed.

Additionally, according to the present aspect, the inner diameter and the outer diameter of the dome cover continuously increase from the top section toward the opening end section. Thus, the mold releasibility from the molding die can be improved.

Preferably, a thickness T of the dome cover is expressed by the following formula in a case where a distance along an outer periphery of the dome cover from the top section to the opening end section is defined as x, a thickness of the dome cover at the opening end section is defined as t1, and a monotonously decreasing function is defined as f(x).

$$T=t1+f(x)$$

According to the present aspect, the thickness T shows a largest value at the top section and a smallest value at the opening end section, and monotonously decreases from the top section toward the opening end section. Thus, the thickness of the dome cover is adjusted according to a path length of a resin injected from a gate within a mold. Accordingly, in the present aspect, the timing of the progress of a resin surrounding the skirt section and the timing of the progress of a resin surrounding the curved section can be matched with each other. Thus, generation of a weldline is suppressed.

Preferably, the monotonously decreasing function f(x) is a primary function, a secondary function, or a cubic function.

According to the present aspect, since the monotonously decreasing function f(x) is the primary function, the secondary function, or the cubic function, it is possible to design changes in the thickness of the dome cover in various aspects.

Preferably, the monotonously decreasing function f(x) may be a function expressed by a free curve.

According to the present aspect, since the monotonously decreasing function f(x) is expressed by the free curve, it is possible to design changes in the thickness of the dome cover in various aspects.

Preferably, a shape of the curved section of the dome cover is an aspheric shape.

According to the present aspect, since the shape of the curved section of the dome cover is the aspheric shape, deterioration of the quality of an image is suppressed in the acquired image.

Preferably, a shape of a longitudinal section of the dome cover is an elliptical shape.

According to the present aspect, since the shape of the longitudinal section of the dome cover is the elliptical shape, deterioration of the quality of an image is suppressed in the acquired image.

Preferably, a shape of a longitudinal section of the dome cover is a hyper-elliptical shape.

According to the present aspect, since the shape of the longitudinal section of the dome cover is the hyper-elliptical shape, deterioration of the quality of an image is suppressed in the acquired image.

A dome cover that is another aspect of the invention is a dome cover that covers a camera. The dome cover comprises a curved section having a curved shape; and a skirt section having a cylinder shape. The skirt section has a connection end section connected to the curved section and an opening end section. A thickness of the curved section is uniform. A thickness of the skirt section is largest at the connection end section and smallest at the opening end section and continuously decreases from the connection end section toward the opening end section.

According to this aspect, the thickness of the skirt section is largest at the connection end section and smallest at the opening end section and continuously decreases from the connection end section toward the opening end section. Thus, the timing of the progress of a resin surrounding the skirt section and the timing of the progress of a resin surrounding the curved section can be matched with each other. Accordingly, in the present aspect, generation of a weldline can suppressed and distortion of an image originating from the boundary surface between the curved section and the skirt section in the acquired image can be suppressed.

Additionally, in the present aspect, the thickness of the skirt section is largest at the connection end section and smallest at the opening end section and continuously decreases from the connection end section toward the opening end section. Thus, distortion of an image originating from the boundary surface between the curved section and the skirt section in the image acquired by the camera device to which the dome cover of the present aspect is attached is suppressed.

Preferably, the curved section has a top section, and an inner diameter and an outer diameter of the dome cover continuously increases from the top section toward the opening end section.

Additionally, according to the present aspect, the inner diameter and the outer diameter of the dome cover continuously increase from the top section toward the opening end section. Thus, the mold releasibility of the dome cover from the molding die can be improved.

Preferably, the dome cover is manufactured by an injection molding method.

According to the present aspect, since the dome cover is manufactured by the injection molding method, generation of a weldline is further suppressed.

A camera device that is still another aspect of the invention comprises a camera; and the dome cover described above, which covers a camera.

An injection molding die that is a still further aspect of the invention comprises a first molding die that molds a front surface of a dome cover; and a second molding die that molds a back surface of the dome cover. Each of the first molding die and the second molding die has a curved section molding part that molds a curved section having a curved shape, a top section molding part that molds a top section at the curved section, a skirt section molding part that molds a skirt section having a cylinder shape, and an opening end molding part that molds an opening end section at the skirt section. Spacing between the first molding die and the second molding die is largest at the top section molding part, and is smallest at the opening end molding part, and the spacing between the first molding die and the second molding die continuously decreases from the top section molding part toward the opening end molding part. An outer diameter molding part that molds an outer diameter of the dome cover in the first molding die, and an inner diameter molding part that molds an inner diameter of the dome cover in the second molding die continuously increases from the top section molding part.

According to the present aspect, the spacing between the first molding die and the second molding die is largest at the top section molding part and smallest at the opening end molding part, and continuously decreases from the top section molding part toward the opening end molding part. Accordingly, in the present aspect, it is possible to mold the dome cover in which generation of a weldline is suppressed and distortion of an image originating from the boundary surface between the curved section and the skirt section in the acquired image is suppressed.

Additionally, according to the present aspect, the outer diameter molding part that molds the outer diameter of the first molding die, and the inner diameter molding part that molds the inner diameter of the second molding die become continuously wide from the top section molding part. Accordingly, in the present aspect, the mold releasibility from the molded dome cover is excellent.

An injection molding method that is a still further aspect of the invention injects a resin to the above-described injection molding die to mold a dome cover.

An injection molding die that is a still further aspect of the invention comprises a first molding die that molds a front surface of a dome cover; and a second molding die that molds a back surface of the dome cover. Each of the first molding die and the second molding die has a curved section molding part that molds a curved section having a curved shape in the dome cover, and a skirt section molding part that molds a skirt section having a cylinder shape in the dome cover. Spacing between the first molding die and the second molding die is uniform at the curved section molding part, and continuously decreases from a connection part with the curved section molding part toward an opening end molding part at the skirt section molding part.

According to the present aspect, the skirt section molding part becomes continuously narrow from the connecting part with the curved section molding part toward the opening end molding part. Accordingly, in the present aspect, it is possible to mold the dome cover in which generation of a weldline is suppressed and distortion of an image originating from the boundary surface between the curved section and the skirt section in the acquired image is suppressed.

An injection molding method that is a still further aspect of the invention injects a resin to the above-described injection molding die to mold a dome cover.

According to the invention, the thickness of the dome cover is largest at the top section and is smallest at the opening end section and continuously decreases from the top section toward the opening end section. Accordingly, the timing of the progress of a resin surrounding the skirt section and the timing of the progress of a resin surrounding the curved section can be matched with each other. Thus, generation of a weldline is suppressed. Additionally, distortion of an image originating from the boundary surface between the curved section and the skirt section in the image acquired by the camera device to which the dome cover of the invention is attached is suppressed.

BRIEF DESCRIPTION OF THE DRAWINGS

FIGS. 1A and 1B are views illustrating an external appearance of a camera device.

DESCRIPTION OF THE PREFERRED EMBODIMENTS

Figure 2:
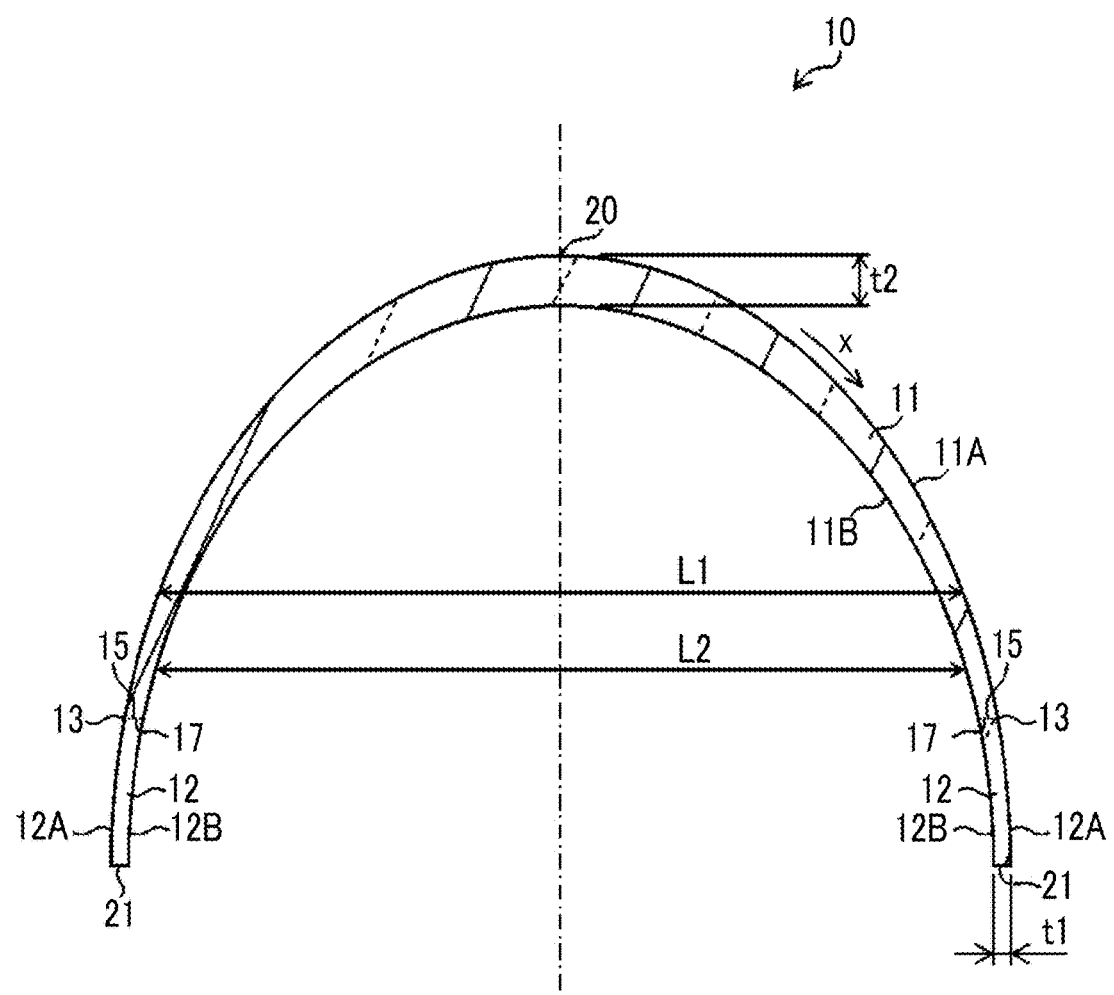
FIG. 2 is a longitudinal sectional view of a dome cover.

Hereinafter, embodiments of a dome cover, a camera device, an injection molding die, and an injection molding method related to the invention will be described according to the accompanying drawings.

FIGS. 1A and 1B are a view illustrating an external appearance of a camera device 100. FIG. 1A is a view illustrating the external appearance of the camera device 100, and FIG. 1B is a view illustrating a case where a dome cover 10 is removed in the camera device 100 illustrated by FIG. 1A.

As illustrated in FIG. 1A, the camera device 100 mainly has a camera 25 that performs imaging, the dome cover 10 provided so as to cover the camera 25, and a pedestal 23 that functions as a turntable in a pan direction of the camera 25. The dome cover 10 is attachable and detachable, and replacement of the dome cover 10 is performed if necessary. Additionally, the camera 25 has an imaging unit 19, and an image is acquired by a subject being imaged by the imaging unit 19.

A case where the dome cover 10 is removed is illustrated in FIG. 1B. The imaging unit 19 of the camera 25 has an optical system consisting of a lens group, and an imaging element. In addition, illustration of the optical system and the imaging element are omitted.

The camera 25 is rotatable on the pedestal 23 in the pan direction as illustrated by arrow A. Additionally, the imaging unit 19 of the camera 25 is rotatable in a tilt direction as illustrated by arrow B. That is, the camera device 100 is a pan tilt camera capable of controlling an imaging direction in the pan direction and the tilt direction. In addition, the camera device 100 is not limited to the pan tilt camera. For example, as the camera device 100, a camera device that can control the imaging direction only in the pan direction, a camera device that can control the imaging direction in the tilt direction, or a camera device that images a fixed point can be adopted.

First Embodiment

The first embodiment of the invention will be described.

Figure 3:
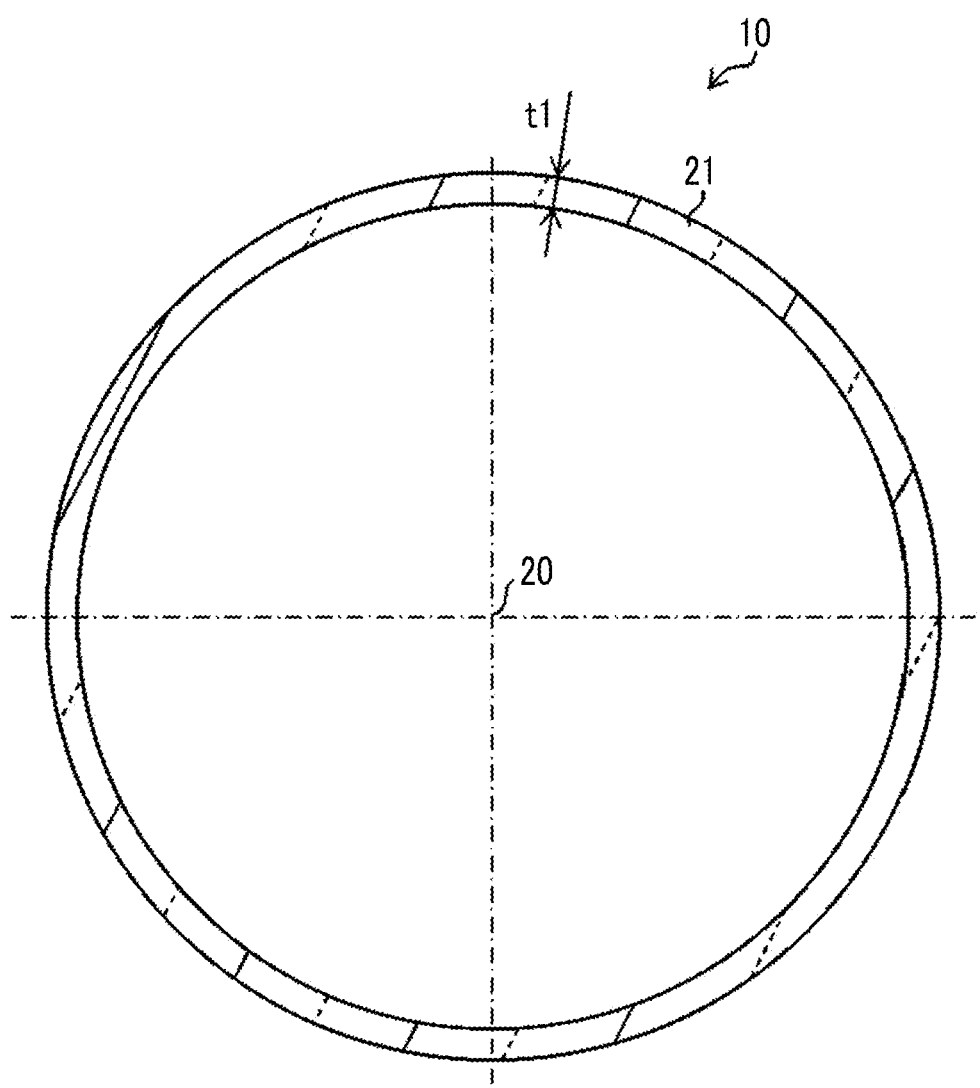
FIG. 3 is a plan view of the dome cover.

FIG. 2 is a longitudinal sectional view of the dome cover 10 illustrated in FIGS. 1A to 1B, and FIG. 3 is a plan view of the dome cover 10 illustrated in FIGS. 1A to 1B.

As illustrated in FIG. 2, the dome cover 10 has a shape including a curved section 11 having a curved shape and a skirt section 12 having a cylinder shape, and as illustrated in FIG. 3, an opening end section 21 has a circular shape. In addition, the shape of the opening end section 21 is not limited to the circular shape, and shapes according to shapes or applications of the camera device 100 to which the dome cover 10 is attached can be adopted.

The curved section 11 has a front surface 11A and a back surface 11B, and is formed in a curved shape by the front surface 11A of the curved section 11 and the back surface 11B of the curved section 11. Here, the "curved shape" means the shape of a smooth convex surface. For example, the curved shape of the curved section 11 may be an aspheric shape, an elliptical surface, or a hyper-elliptical shape. In addition, the aspheric surface means a surface without a discontinuous surface, and the characteristic of the aspheric surface is that an optical property continues.

The curved section 11 has a top section 20, and the thickness of the dome cover 10 becomes largest at the top section 20. In addition, the thickness of the top section 20 is defined as t2 in FIG. 2.

The curved section 11 is joined to the skirt section 12 via a boundary surface 13. Additionally, the boundary surface 13 is constituted of a connection end section 15 of the curved section 11 and a connection end section 17 of the skirt section 12.

The skirt section 12 has a front surface 12A and a back surface 12B, and is formed in a cylinder shape by the front surface 12A of the skirt section 12 and the back surface 12B of the skirt section 12. Here, the "cylinder shape" means round, elongated, and hollow. For example, the cylinder shape is a hollow shape of a truncated cone, a cylindrical shape, or a shape of a portion of a spherical surface.

The skirt section 12 has the opening end section 21, and the thickness of the dome cover 10 becomes smallest at the opening end section 21. In addition, the thickness of the opening end section 21 is defined at t1 in FIG. 2.

As illustrated in FIG. 2, the thickness of the dome cover 10 continuously decreases from the top section 20 toward the opening end section 21. Here, the "thickness continuously decreases" means that there is no discontinuous portion in a change of the reduction of the thickness, and means that the reduction of the thickness is smoothly performed.

An outer diameter L1 and an inner diameter L2 of the dome cover 10 continuously increase from the top section 20 to the opening end section 21. Here, "the outer diameter L1 and the inner diameter L2 continuously increase" means that increase changes in the lengths of the outer diameter L1 and the inner diameter L2 of the dome cover 10 are continuous, and means that increase in the lengths of the outer diameter L1 and the inner diameter L2 of the dome cover 10 is smoothly performed.

Figure 5:
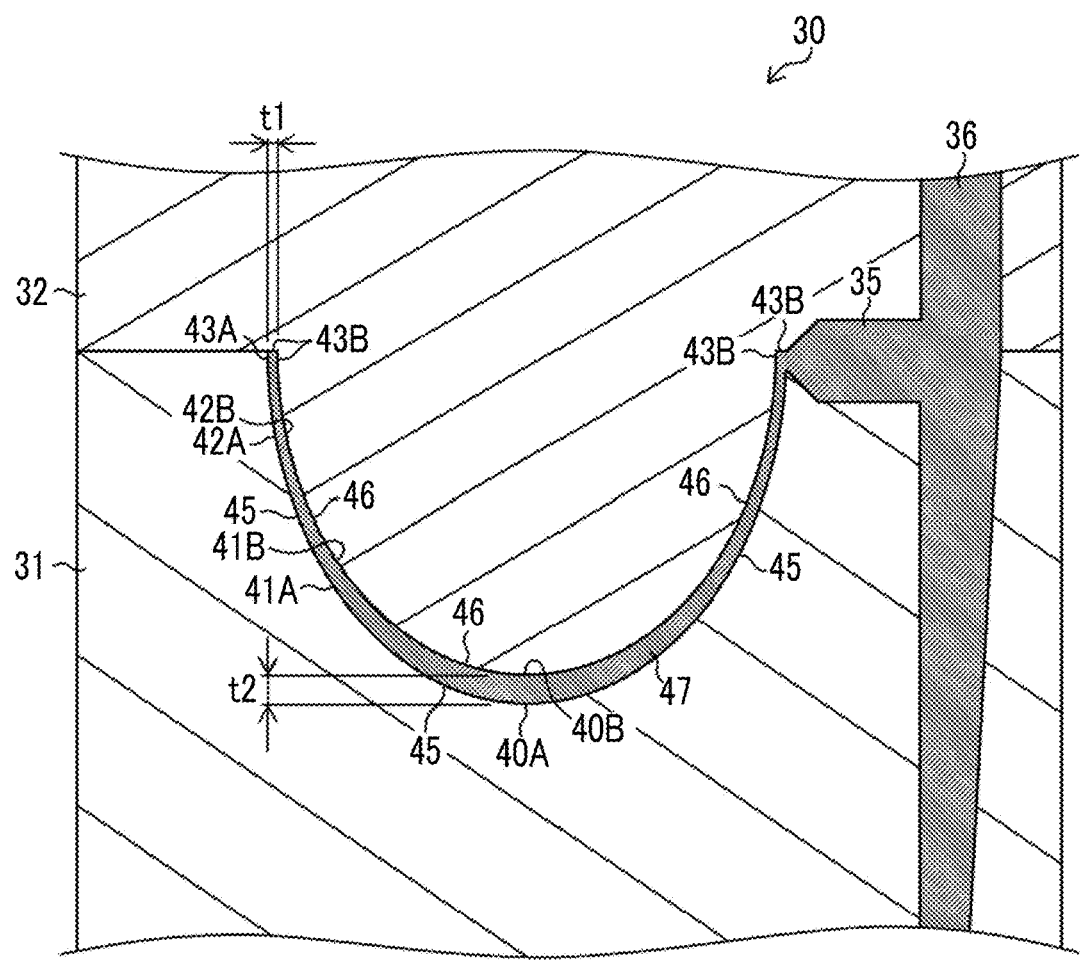
FIG. 5 is a longitudinal sectional view of an injection molding die.

Since the inner diameter L2 and the outer diameter L1 of the dome cover 10 continuously increase from the top section 20 toward the opening end section 21, the dome cover 10 is excellent in the mold releasability from an injection molding die 30 (FIG. 5).

In addition, the opening end section 21 may be provided with an attachment part (not illustrated) for connection with the camera device 100. That is, since the dome cover 10 covers the camera 25 by being attached to the camera 25, the pedestal 23, or the like as illustrated in FIGS. 1A to 1B, the dome cover 10 may have the attachment part at a distal end of the opening end section 21. Although the shape of the attachment part is not particularly limited, for example, the shape of the attachment part may be a cylindrical shape, or screw threads may be attached to the cylindrical attachment part. By further providing the opening end section 21 with the cylindrical attachment part, the attachment between the dome cover 10 and the camera device 100 is ensured. Although the size of the attachment part is not particularly limited, for example, the attachment part has a height within a range of 2% or more and 7% or less, preferably, 3% or more and 6% or less of the height of the dome cover 10.

Next, the thickness of the dome cover 10 will be described. The thickness of the dome cover 10 is largest at the top section 20 and is smallest at the opening end section 21, and continuously decreases from the top section 20 toward the opening end section 21. By designing the thickness of the dome cover 10 in this way, the timing of the progress of a resin surrounding the skirt section 12 and the timing of the progress of a resin surrounding the curved section 11 can be matched with each other. Additionally, distortion of an image originating from the boundary surface 13 between the curved section 11 and the skirt section 12 in the image acquired by the camera device 100 to which the dome cover 10 is attached is suppressed.

Figure 4:
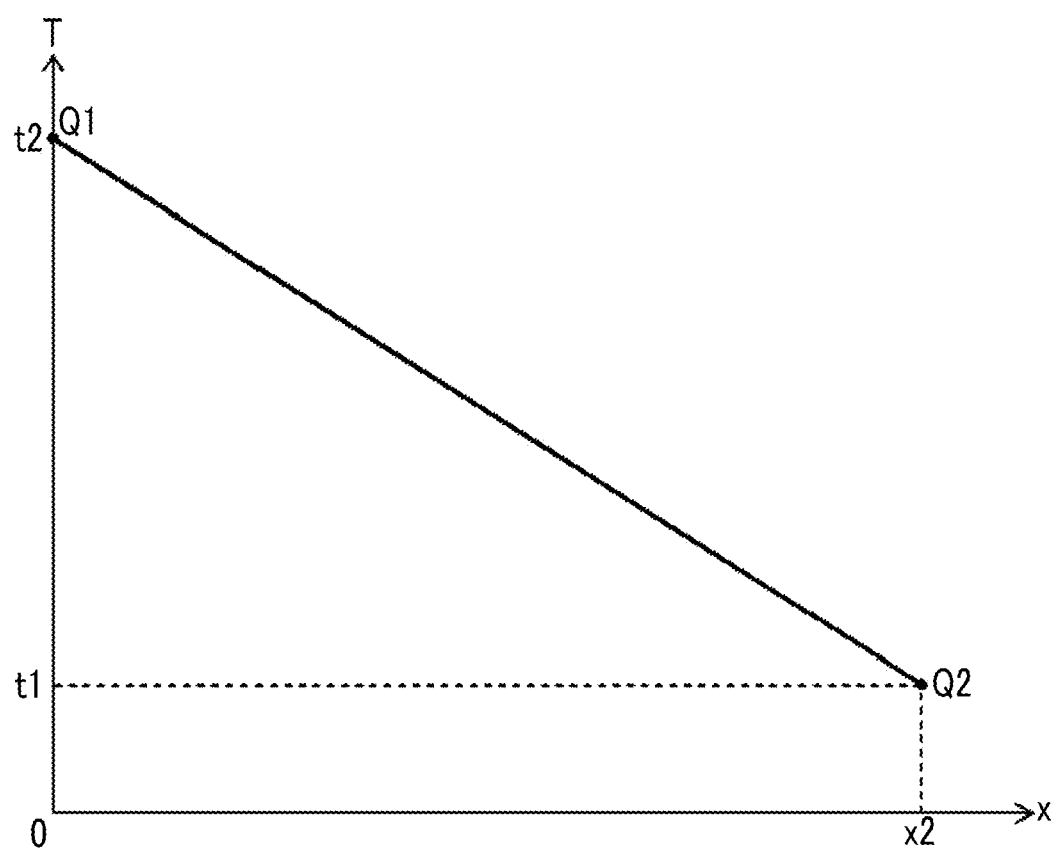
FIG. 4 is a view illustrating an example of changes in the thickness of the dome cover.

FIG. 4 is a view illustrating an example of changes in the thickness of the dome cover 10. FIG. 4 is a graph on which, in the longitudinal sectional view of the dome cover 10 illustrated in FIG. 2, a distance (outer periphery) from the top section 20 to the opening end section 21 along front surfaces (the front surface 11A of the curved section 11 and the front surface 12A of the skirt section 12) of the dome cover 10 is illustrated as x, and a thickness the dome cover 10 at the distance x is illustrated as T. In addition, t2 illustrated in FIG. 3 shows the thickness at the top section 20, and t1 shows the thickness at the opening end section 21 of the dome cover 10. In addition, the distance x along the front surface of the dome cover 10 from the top section 20 to the opening end section 21 is illustrated on a horizontal axis of FIG. 4, and the thickness of the dome cover 10 is illustrated on a vertical axis.

The coordinates of a point Q1 are (0, t2), which show the thickness of the dome cover 10 at the top section 20. Additionally, the coordinates of a point Q2 are (x2, t1), which show the thickness of the dome cover 10 at the opening end section 21. In the example illustrated in FIG. 4, the point Q1 and the point Q2 are connected together by a monotonously decreasing linear function. In addition, t1 and t2 are appropriately determined according to applications, optical properties, or the like of the dome cover 10. For example, t1 is a value of 80% or more and 95% or less, preferably, a value of 85% or more and 90% or less of t2. Additionally, x2 is a distance along an outer periphery of the dome cover 10 from the top section 20 to the opening end section 21.

Additionally, supposing that the point Q1 and the point Q2 are connected together by a function f(x), the thickness T of the dome cover 10 is expressed by the following formula. In addition, f(x) is taken as at least a monotonously decreasing function. Here, the "monotonously decreasing" means that there is no increase and the inclination thereof decreases without becoming zero. Additionally, f(x) is a function having a value of t3 (t3=t2−t1) when x=0.

$$T = t1 + f(x)$$

In addition, the function f(x) may be a monotonously decreasing function and may be a primary function, a secondary function, or a cubic function. Additionally, the function f(x) may be a function expressed by a free curve. For example, the free curve may be a function or the like expressed by Fourier series.

Additionally, a specific example of the function f(x) may be a function showing an elliptical shape expressed by the following formula.

$$(x/a)^2 + (y/b)^2 = 1$$

Additionally, a specific example of the function f(x) may be a function showing a hyper-elliptical shape expressed by the following formula.

$(|x|/a)^p+(|y|/b)p=1$ (where $p>2$). Next, the injection molding die 30 for manufacturing the dome cover 10 of the invention through injection molding will be described.

FIG. 5 is a longitudinal sectional view of the injection molding die 30 for injection-molding the dome cover 10 illustrated in FIGS. 1A to 1B.

The injection molding die 30 includes a first molding die 31 that molds the front surface of the dome cover 10, and a second molding die 32 that molds the back surface of the dome cover 10.

The first molding die 31 and the second molding die 32 respectively have curved section molding parts (41A and 41B) that mold the curved section 11 having the curved shape, top section molding parts (40A and 40B) that mold the top section 20 at the curved section 11, skirt section molding parts (42A and 42B) that mold the skirt section 12 having the cylinder shape, and opening end molding parts (43A and 43B) that mold the opening end section 21 at the skirt section 12.

The spacing between the first molding die 31 and the second molding die 32 is largest t2 at the top section molding parts (40A and 40B), and is smallest t1 at the opening end molding parts (43A and 43B). Additionally, the spacing between the first molding die 31 and the second molding die 32 continuously decreases from the top section molding parts (40A and 40B) toward the opening end molding parts (43A and 43B). This corresponds to the thickness of the dome cover 10 continuously decreasing from the top section 20 toward the opening end section 21 in the dome cover 10.

Moreover, a front surface molding part (outer diameter molding part) 45 that molds the front surface of the dome cover 10 in the first molding die 31, and a back surface molding part (inner diameter molding part) 46 that molds the front surface of the dome cover 10 in the second molding die 32 become continuously wide from the top section molding parts toward the opening end molding parts. Accordingly, it is possible to mold the dome cover 10 in which the inner diameter L2 and the outer diameter L1 continuously increase.

Resins to be used in ordinary injection molding methods are used for the injection molding die. For example, a thermoplastic resin is preferably used, and cyclo olefin copolymer (COC), a cyclo olefin polymer (COP), acrylic, polycarbonates, or the like is used.

A melted resin passes through a spool 36 and is injected into a cavity part 47 from a gate 35. According to the injection molding die 30 illustrated in FIG. 5, since the spacing (cavity part 47) of the first molding die 31 and the second molding die 32 continuously decreases from the top section molding parts (40A and 40B) toward the opening end molding parts (43A and 43B). Thus, the timing of the progress of a resin surrounding the skirt section 12 and the timing of the progress of a resin surrounding the curved section 11 can be matched with each other. Accordingly, it is possible to mold the dome cover 10 in which generation of a weldline is suppressed and distortion of an image originating from the boundary surface 13 between the curved section 11 and the skirt section 12 in the acquired image is suppressed. Additionally, since the front surface molding part 45 that molds the front surface of the dome cover 10, and the back surface molding part 46 that molds the front surface of the dome cover 10 become continuously wide from the top section molding parts (40A and 40B), it is possible to mold the dome cover 10 with excellent mold releasability from the injection molding die 30.

Next, the generation of a weldline being suppressed in the invention will be described.

FIGS. 6A to 6F are schematic views of a case where the dome cover 10 is injection-molded using the injection molding die 30 described in FIG. 5.

If resins are injected into the cavity part 47 of the injection molding die 30 from the gate 35, the injected resins progress as illustrated by from FIGS. 6A to 6F.

Since the shape of the dome cover 10 is not a semi-sphere, a path for the resin M and a path for the resin N are different from each other. That is, the path for the resin M is a path that passes through the vicinities of the top section molding parts (40A and 40B), and the path for the resin N is a path that passes through the vicinities of the skirt section molding parts (42A and 42B). Hence, since the shape of the dome cover 10 is not a semi-spherical shape, the path for the resin M becomes longer than the path for the resin N.

Since the spacings at the top section molding parts (40A and 40B) and the curved section molding parts (41A and 41B) are wide in the injection molding die 30, the progress of the resin M surrounding the vicinity of the top section 20 of the dome cover 10 becomes fast. On the other hand, since the spacing becomes narrow at the skirt section molding parts (42A and 42B) in the injection molding die 30, the progress of the resin N surrounding the vicinity of the skirt section of the dome cover 10 becomes slow.

By adjusting the spacing (the cavity part 47) between the first molding die 31 and the second molding die 32 in this way, it is possible to adjust the speed of the progress of resins to the timing when the resin M surrounding the vicinity of the top section 20 of the dome cover 10 and the resin N surrounding the vicinity of the skirt section of the dome cover 10 meet (intersect) each other. That is, the timing when the resin M and the resin N meet each other can be adjusted by widening the spacing in the vicinity of the top section molding part (40A and 40B) to advance the progress of the resin M because the path for the resin M is longer than the path for the resin N and by narrowing the spacing in the vicinity of the skirt section molding parts (42A and 42B) to retard the progress of the resin N because the path for the resin N is shorter than the path for the resin M.

Figure 6A:
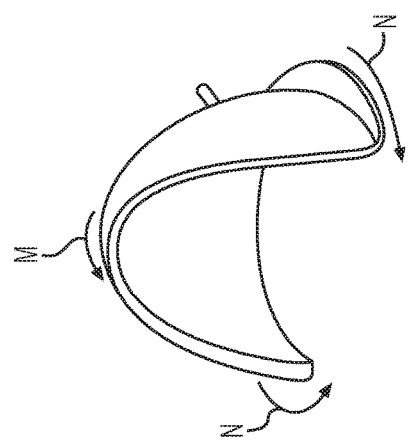
FIGS. 6A to 6F are schematic views of the progress of resins in a case where the dome cover is injection-molded.
Figure 6B:
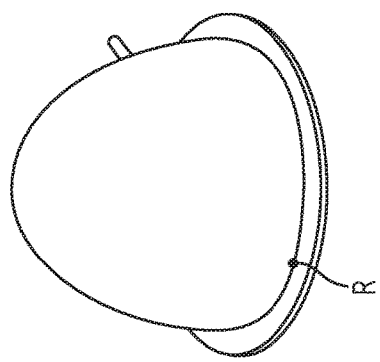
Figure 6C:
Figure 6D:
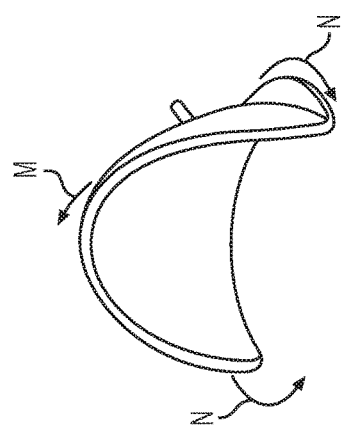
Figure 6E:
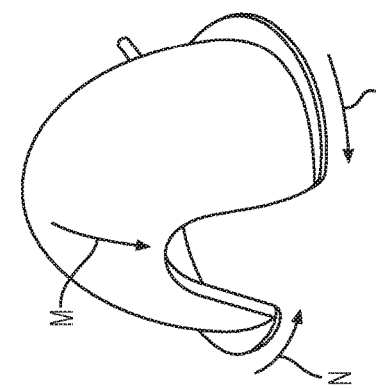
Figure 6F:
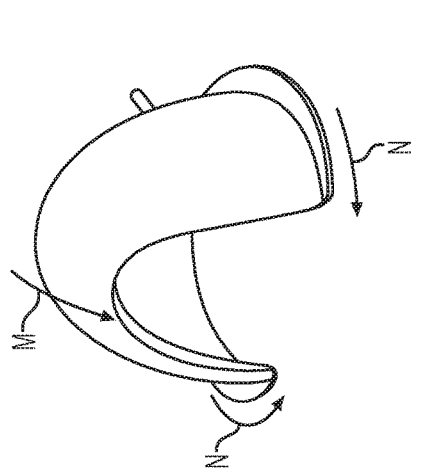

If the injection molding die 30 in which the progress of the timing when the resin M and the resin N is used, the resin M and the resin N intersect each other in the vicinity of a point R as illustrated by FIG. 6F. Thus, generation of a weldline is suppressed.

FIGS. 7A to 7F conceptually illustrate the progress of resins in a case where the dome cover 10 with uniform thickness throughout the dome cover is molded. Generation of a weldline will be described with respect to FIGS. 7A to 7F.

If resins are injected into the cavity part 47 of the injection molding die 30 from the gate 35, the injected resins progress as illustrated by from FIGS. 6A to 6F.

The dome cover 10 illustrated in FIGS. 7A to 7F does not have a semi-spherical shape but has a shape formed by the curved section 11 and the skirt section 12, similar to the dome cover 10 illustrated in FIGS. 6A to 6F. Hence, the path for the resin M becomes longer than the path for the resin N.

Figure 7C:
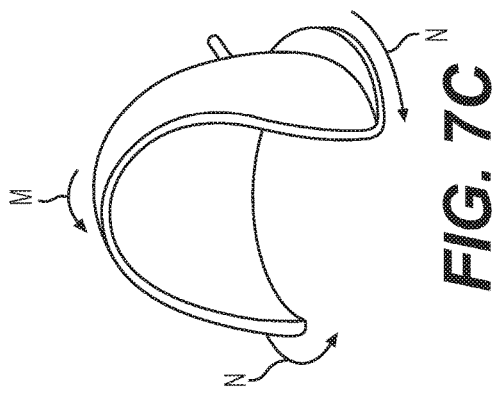
FIGS. 7A to 7F are schematic views of the progress of the resins in a case where the dome cover is injection-molded.
Figure 7F:
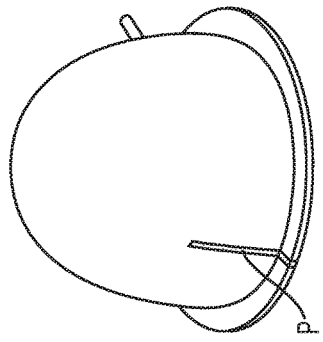
Figure 7B:
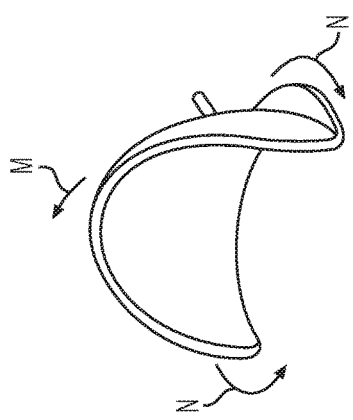
Figure 7E:
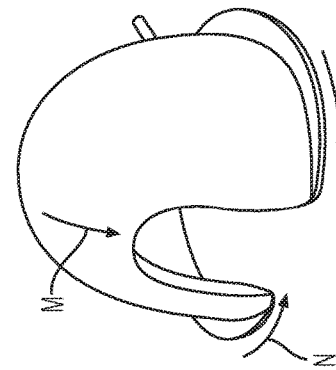
Figure 7A:
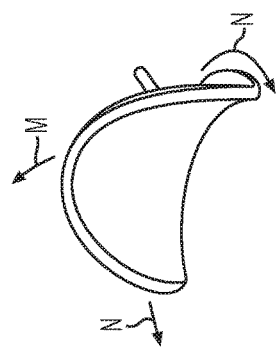
Figure 7D:
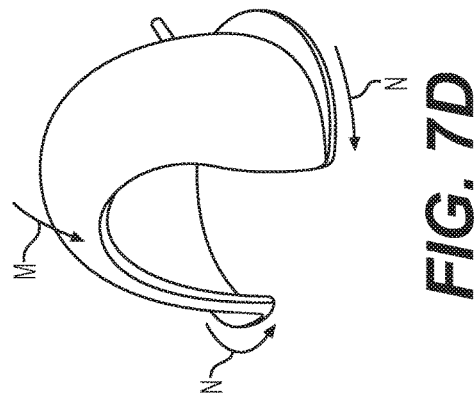

Additionally, in the case illustrated in FIGS. 7A to 7F, the spacings at the top section molding parts (40A and 40B) and the curved section molding parts (41A and 41B) are uniform. Hence, the resin M and the resin N progress at the same speed. Hence, in the case illustrated in FIGS. 7A to 7B, the timing of the resin M and the timing of the resin N are adjusted, but the resin M intersects the resin N surrounding the vicinity of the skirt section so as to be later than the resin N (refer to FIG. 6E and FIG. 7E). Accordingly, as illustrated in FIG. 7F, a weldline P will be generated.

Second Embodiment

Next, a second embodiment of the dome cover 10 will be described.

Figure 8:
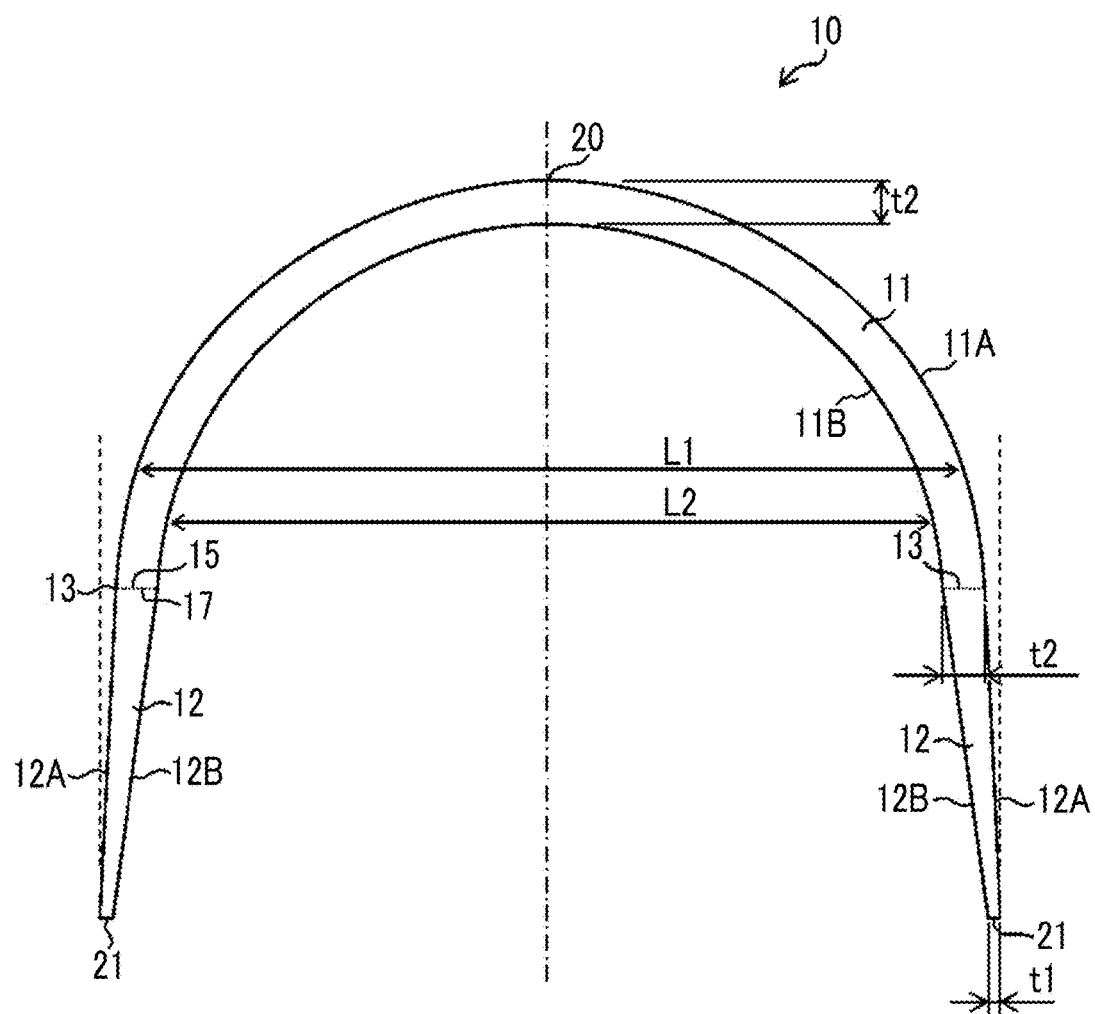
FIG. 8 is a longitudinal sectional view of the dome cover.

FIG. 8 is a longitudinal sectional view of the dome cover 10, illustrating the dome cover 10 of the second embodiment. The portions that have been already described in FIG. 2 will be designated by the same reference signs, and the description thereof will be omitted.

The dome cover 10 of the second embodiment includes the curved section 11 having a curved shape and the skirt section 12 having a cylinder shape.

The curved section 11 has a semi-spherical shape formed by the front surface 11A and the back surface 11B of the curved section 11. Additionally, the thickness at the top section 20 of the curved section 11 is t2, the thickness at the connection end section 15 (boundary surface 13) of the curved section 11 is also t2, and the thickness of the curved section 11 is uniform. That is, the thickness at the curved section 11 is t2 over the whole region of the curved section 11, and is different from that at the curved section 11 of the first embodiment of which the thickness continuously decreases.

The skirt section 12 has a hollow truncated cone shape formed by the front surface 12A and the back surface 12B of the skirt section 12. Additionally, the skirt section 12 is connected to the connection end section 15 of the curved section 11 via the connection end section 17 of the skirt section 12 in the boundary surface 13. The thickness of the skirt section 12 is largest at the connection end section 17 of the skirt section 12 and is smallest at the opening end section 21, and continuously decreases from the connection end section 17 of the skirt section 12 toward the opening end section 21. That is, the thickness at the connection end section 17 of the skirt section 12 is t2, the thickness at the opening end section 21 of the skirt section 12 is t1, and the thickness of the skirt section 12 continuously decreases.

Additionally, since the inner diameter L2 and the outer diameter L1 of the dome cover 10 continuously increase from the top section 20 toward the opening end section 21, the dome cover 10 is excellent in the mold releasibility from an injection molding die 30.

In this way, in the present embodiment, the skirt section 12 becomes continuously thin from the connection end section 17 toward the opening end section 21 even in a case where the curved section 11 has the semi-spherical shape and has the uniform thickness. Thus, during the molding of the dome cover 10, the timing of the progress of a resin that forms the skirt section 12 and the timing of the progress of a resin that forms the curved section 11 can be matched with each other. Accordingly, in the present embodiment, generation of a weldline can be suppressed. Additionally, distortion of an image originating from the boundary surface between the curved section and the skirt section in the image acquired by the camera device to which the dome cover 10 of the present embodiment is attached is suppressed.

Figure 9:
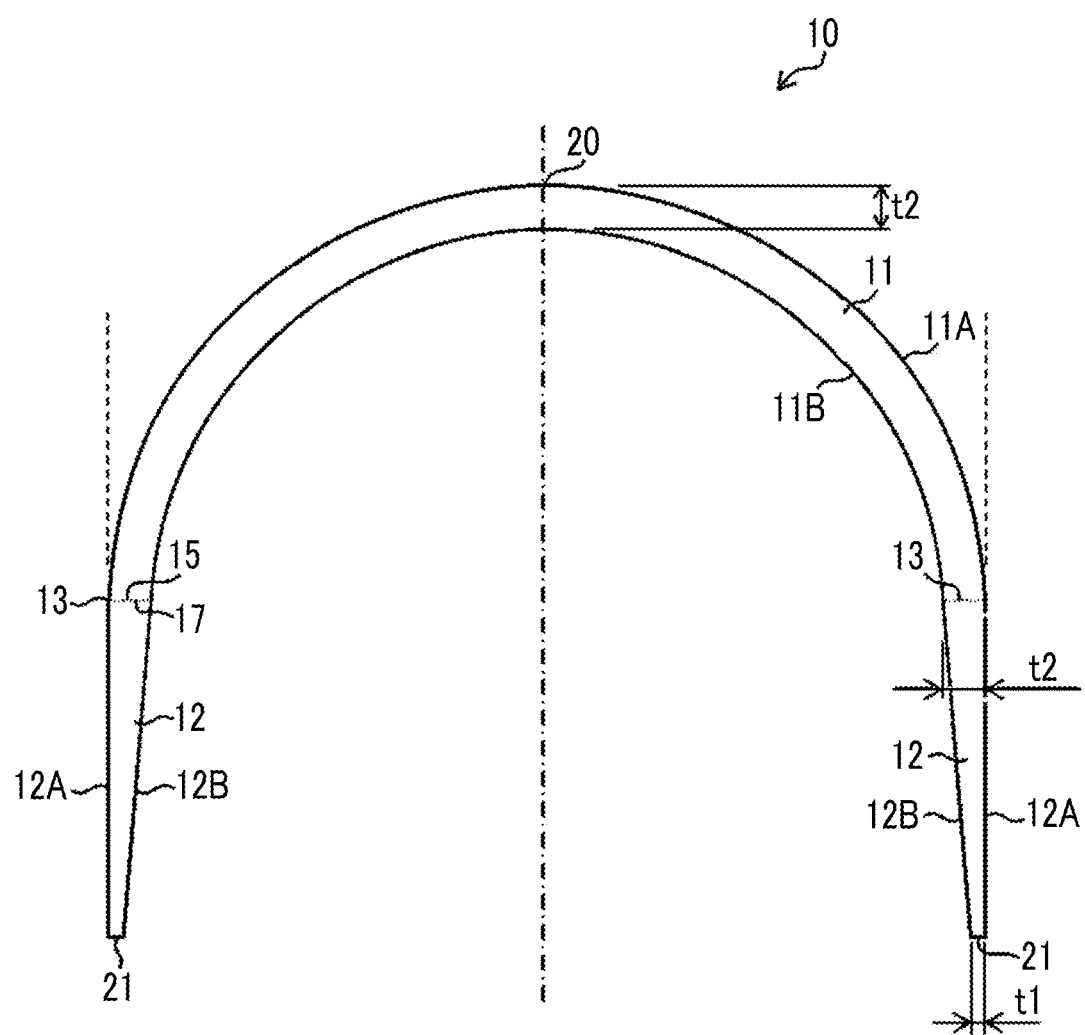
FIG. 9 is a longitudinal sectional view of the dome cover.

FIG. 9 is a longitudinal sectional view of the dome cover 10, illustrating the dome cover 10 of a modification example of the second embodiment. The portions that have been already described in FIG. 8 will be designated by the same reference signs, and the description thereof will be omitted.

The curved section 11 has a semi-spherical shape formed by the front surface 11A and the back surface 11B of the curved section 11, similar to the dome cover 10 illustrated in FIG. 8. Additionally, the thickness of the curved section 11 of the dome cover 10 is the same at the top section 20 and the connection end section 15 and is t2, and is uniform over the whole region of the curved section 11.

The skirt section 12 has a hollow columnar shape formed by the front surface 12A and the back surface 12B of the skirt section 12. Additionally, the skirt section 12 is connected to the connection end section 15 of the curved section 11 via the connection end section 17 of the skirt section 12 in the boundary surface 13. The thickness of the skirt section 12 is largest at the connection end section 17 of the skirt section 12 and is smallest at the opening end section 21, and continuously decreases from the connection end section 17 of the skirt section 12 toward the opening end section 21. That is, the thickness at the connection end section 17 of the skirt section 12 is t2, the thickness at the opening end section 21 of the skirt section 12 is t1, and the thickness of the skirt section 12 continuously decreases.

Also in the dome cover 10 of the modification example (FIG. 9) of the second embodiment, the thickness continuously decreases in the skirt section 12. Thus, during the molding of the dome cover 10, the timing of the progress of a resin that forms the skirt section 12 and the timing of the progress of a resin that forms the curved section 11 can be matched with each other. Accordingly, in the present example, generation of a weldline can be suppressed. Additionally, distortion of an image originating from the boundary surface between the curved section and the skirt section in the image acquired by the camera device to which the dome cover of the present embodiment is attached is suppressed.

Figure 10:
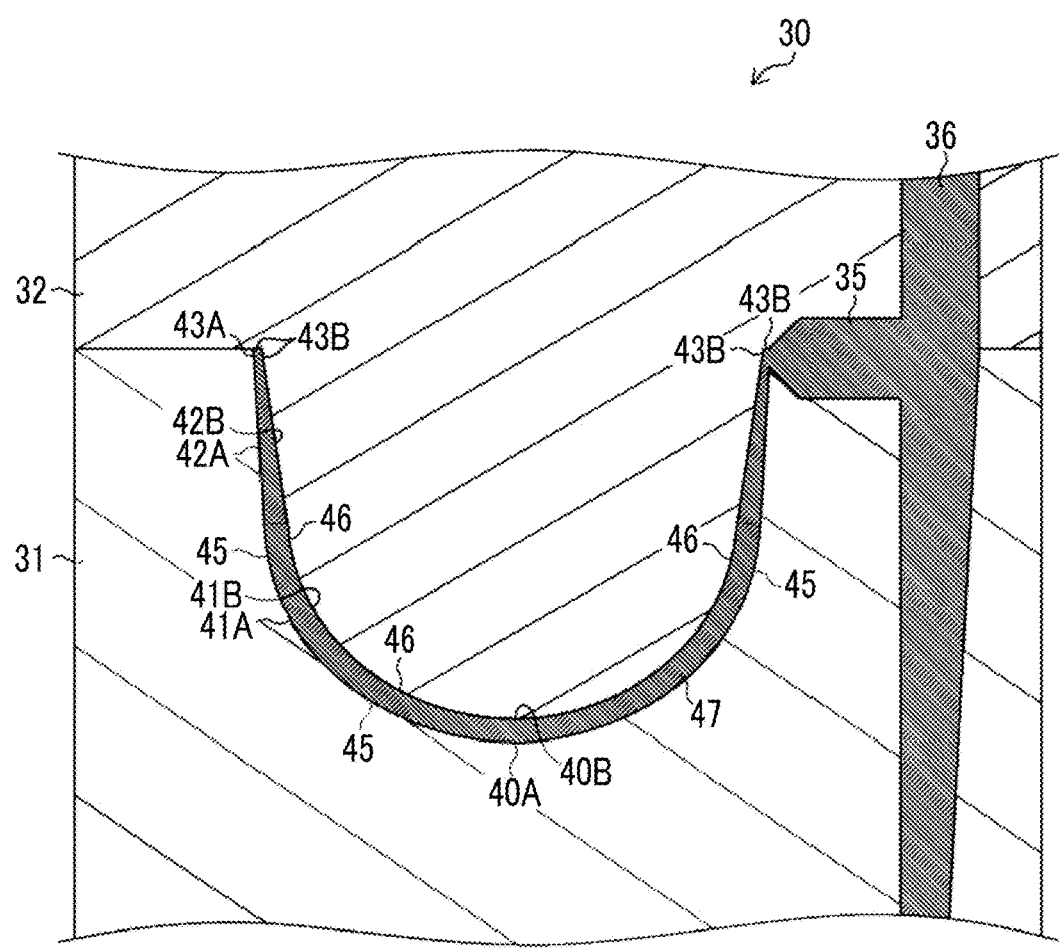
FIG. 10 is a longitudinal sectional view of the injection molding die.

FIG. 10 is a longitudinal sectional view of the injection molding die 30 for injection-molding the dome cover 10 illustrated in FIG. 8. In addition, the portions that have been already described in FIG. 5 will be designated by the same reference signs, and the description thereof will be omitted.

The first molding die 31 and the second molding die 32 respectively have the curved section molding parts (41A and 41B) that mold the curved section 11 having the curved shape, the top section molding parts (40A and 40B) that mold the top section 20 at the curved section 11, the skirt section molding parts (42A and 42B) that mold the skirt section 12 having the cylinder shape, and the opening end molding parts (43A and 43B) that mold the opening end section 21 at the skirt section 12.

The spacing between the first molding die 31 and the second molding die 32 is uniform at the curved section molding parts (41A and 41B). Additionally, the spacing between the first molding die 31 and the second molding die 32 continuously decreases from connecting parts with the curved section molding parts (41A and 41B) toward the opening end molding parts (43A and 43B) at the skirt section molding parts (42A and 42B).

As described above, the dome cover 10 in which generation of a weldline is suppressed can be molded by molding the dome cover 10 by the injection molding method using the injection molding die 30 of the present embodiment.

Although the example of the invention has been described above, it is obvious that the invention is not limited to the above-described embodiment, and various modifications can be made without departing from the spirit of the invention.

EXPLANATION OF REFERENCES

10: dome cover
11: curved section

12: skirt section
13: boundary surface
19: imaging unit
20: top section
21: opening end section
23: pedestal
25: camera
30: injection molding die
31: first molding die
32: second molding die
100: camera device
L1: outer diameter
L2: inner diameter

What is claimed is:

1. A camera device comprising:
a camera; and
a dome cover that covers the camera, the dome cover comprising:
a curved section having a curved shape; and
a skirt section having a cylinder shape, the skirt section provided at one end of the dome cover,
wherein a top section is provided at the curved section and an opening end section is provided at the skirt section, the top section provided at another end of the dome cover,
wherein a thickness of the dome cover is largest at the top section and is smallest at the opening end section and continuously decreases from the top section toward the opening end section,
wherein an inner diameter and an outer diameter of the dome cover continuously increase from the top section toward the opening end section,
wherein the camera is capable of capturing an image including a boundary between the curved section and the skirt section, and
wherein a thickness T of the dome cover is expressed by the following formula in a case where a distance along an outer periphery of the dome cover from the top section to the opening end section is defined as x, a thickness of the dome cover at the opening end section is defined as t1, and a monotonously decreasing function is defined as f(x), $T=t1+f(x)$, and wherein a thickness of opening end section is 85% or more and 90% or less than a thickness of the top section.

2. The camera device according to claim 1,
wherein the monotonously decreasing function f(x) is a primary function, a secondary function, or a cubic function.

3. The camera device according to claim 1,
wherein the monotonously decreasing function f(x) is a function expressed by a free curve.

4. The camera device according to claim 1,
wherein a shape of the curved section of the dome cover is an aspheric shape.

5. The dome cover according to claim 1,
wherein a shape of a longitudinal section of the dome cover is an elliptical shape.

6. The dome cover according to claim 1,
wherein a shape of a longitudinal section of the dome cover is a hyper-elliptical shape.

7. The camera device of claim 1, wherein the monotonously decreasing function of an elliptical shape of the dome cover is $f(x)=(x/a)^2+(y/b)^2=1$.

8. The camera device of claim 1, wherein the monotonously decreasing function of an hyper-elliptical shape of the dome cover is $f(x)=(|x|/a)^p+(|y|/b)p=1$ (where p>2).

9. A camera device comprising:
a camera; and
a dome cover that covers a camera, the dome cover comprising:
a curved section having a curved shape at one end of the dome cover; and
a skirt section having a cylinder shape at another end of the dome cover opposite to the one end of the dome cover,
wherein the skirt section has a connection end section connected to the curved section and an opening end section opposite to the curved section, the opening end section provided at the another end of the dome cover,
wherein a thickness of the curved section is uniform,
wherein a thickness of the skirt section is largest at the connection end section and smallest at the opening end section and continuously decreases from the connection end section toward the opening end section,
wherein the camera is capable of capturing an image including a boundary between the curved section and the skirt section),
and wherein a thickness of opening end section is 85% or more and 90% or less than a thickness of the top section.

10. The camera device according to claim 9,
wherein the curved section has a top section, and
wherein an inner diameter and an outer diameter of the dome cover continuously increase from the top section toward the opening end section.

11. The camera device according to claim 9,
wherein the dome cover is manufactured by an injection molding method.

* * * * *